June 24, 1952 J. LEONARD 2,601,441

MEANS FOR BROADCASTING TELEVISION PERFORMANCES

Filed Nov. 12, 1949

JEAN LEONARD,
INVENTOR.

BY James M. Abbott

ATTORNEY

Patented June 24, 1952 2,601,441

UNITED STATES PATENT OFFICE 2,601,441

MEANS FOR BROADCASTING TELEVISION PERFORMANCES

Jean Leonard, Los Angeles, Calif.

Application November 12, 1949, Serial No. 126,765

4 Claims. (Cl. 88—1)

This invention relates to the art of television, and particularly pertains to a means of televising a performance.

At the present time the broadcasting of television programs is accomplished by placing the performers on a stage and suitably illuminating the stage along the forward edge while a curtain or backdrop is placed at the rear of the performers. The cameras are usually placed in front of the performers and in the rear of the lights or at points of advantage therearound. This, therefore, interposes the cameras and their operators between the performers and the audience. This will obscure the view and cause confusion and annoyance to the audience and therefore a relatively large television screen is arranged at one side of the stage which can be observed by the audience. At this same time the voice and other sound effects occurring on the stage will be transmitted through a loud speaker. It will thus be seen that in this arrangement the audience does not view the actors directly, and the audience will not be as interested as it is in connection with radio programs when direct audience participation is possible. It is to be also pointed out that the screen displays the images in such large size that the pictures are blurred and are not always visible. For this reason the attendance at television broadcasts has not been as satisfactory as that at radio broadcasts, and therefore the sponsors have not been greatly attracted to television programs. It is the principal object of the present invention, therefore, to provide a method and means for producing television performances in which the cameras and their operators will not obstruct the view of the audience or the performers, and will insure direct audience participation between the audience and the performers on the stage.

The present invention contemplates the provision of a stage or platform in direct view of an audience, and which stage is properly illuminated for photographic purposes, the stage having a backdrop formed with openings through which cameras may be focused, the stage being separated from the audience by a screen made of material known as a "Magic Mirror," having the characteristic of being transparent when viewed from the audience side of it, and providing reflecting surfaces on the mirror side so that the cameras may photograph the reflections of the performers and broadcast the same.

The invention is illustrated by way of example in the accompanying drawings in which.

Figure 1:
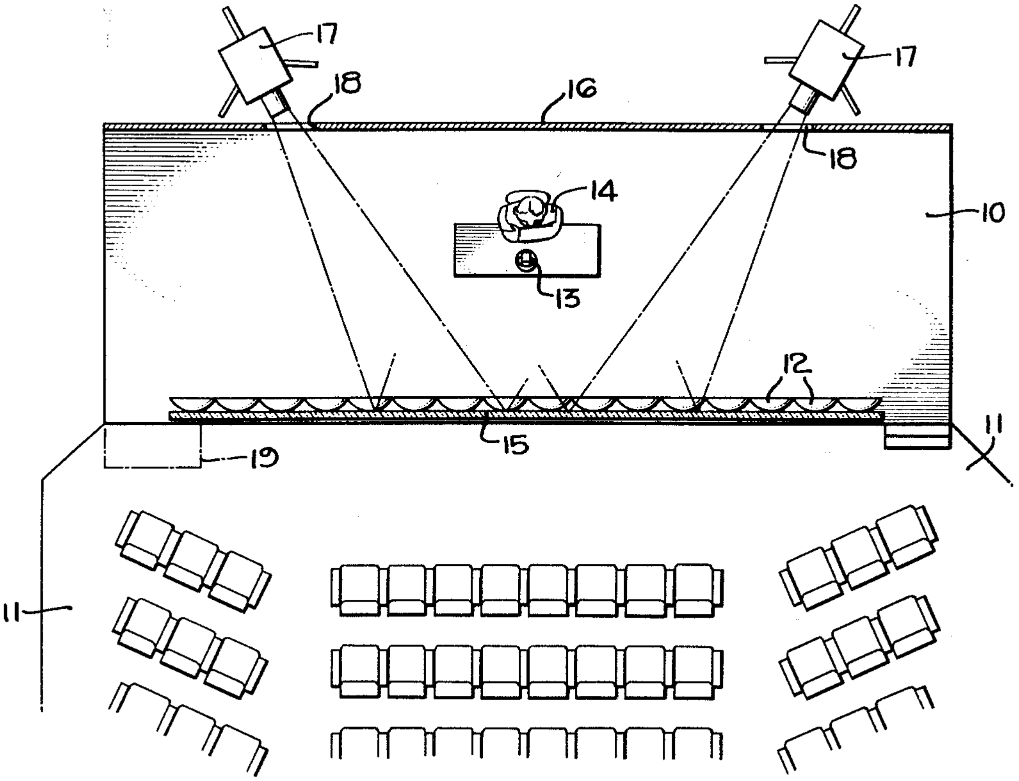
Figure 1 is a view in plan showing the schematic arrangement of a stage for the production of a television program.
Figure 2:
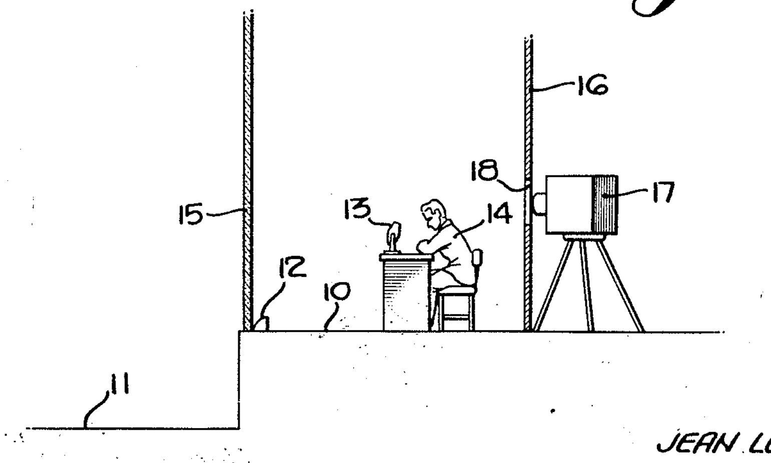
Fig. 2 is a view in end elevation showing the manner in which the reflecting screen and the curtain are arranged with relation to the performers, and also showing possible arrangements of television cameras.

Referring more particularly to the drawings, 10 indicates a platform or stage upon which a television performance is to take place, and 11 indicates a fragmentary portion of the auditorium occupied by an audience. Disposed along the front of the stage are suitable footlights 12, and if desired other lights may be provided to obtain different lighting effects. On or over the stage are microphones 13 which may be used by the performers 14. In advance of the footlights 12 and interposed between the stage and the audience is a screen 15. This screen is constructed of material having the trade name "Magic Mirror." "Magic Mirror" material is a glass suitably treated or coated so that a person on one side can look through the glass without obstruction, and to a person on the other side the glass will present a mirror surface. Thus, if the screen 15 is disposed so that the transparent side is presented to the audience it will be possible for the audience to look through the screen and view the performers directly, while the performers will appear as mirrored images on the back side of the screen. The screen 15 is scientifically known as a light dividing mirror and one of the conditions for its operation as above described is for the auditorium to be relatively dimly lighted while the stage occupied by the performers is relatively brightly lighted. The back of the stage 10 is provided with a backdrop or curtain 16 which is opaque and in the rear of which are cameras 17. The cameras are focused through relatively small openings 18 in the curtain 16 and are not readily visible to the audience.

In broadcasting a television performance the stage 10 is set up with the backdrop 16 and the Magic Mirror partition 15 at the forward edge thereof. The stage is suitably illuminated with various lighting equipment, such as the footlights 12, while the auditorium 11 is left substantially dark. Cameras 17 may be positioned in the rear of the backdrop 16 so that the images of the performers 14 may be photographed on the reflecting surface of the screen 15. The television cameras 17 will then broadcast the performance and will only broadcast the reflected images appearing on the back of the Magic Mirror screen 15. The audience occupying the seats of the auditorium 11 may view the performers directly and without obstruction through the Magic Mirror screen 15. The sound originating on the stage may be heard directly around the sides of the screen 15 or may be broadcast from the microphone 13 through a loud-speaker system. In any event it will be seen that the audience will not be required to view the performance on a television set and small screen, as indicated by dotted lines at 19.

It is to be understood that while the partition 15 has been described as being made of glass material known as "Magic Mirror" that any other equivalent material might be used in which the phenomenon is obtained of having the effect of transparency on one side of the screen and the effect of a mirror reflecting surface on the opposite side of the screen.

It will thus be seen that the method and means for broadcasting a television performance as here disclosed insures a direct view of the performance by the audience without the use of any intermediate transmission mechanism, and suitable freedom of action by the performers since they cannot view the audience. It will further be seen that direct audience participation can take place, and that the performance will appear life-like and full-size to the audience, and at the same time there will be complete freedom of the cameraman and technicians in photographing the performance while concealed behind the backdrop.

It is to be understood that while the present invention has been described as being suitable for broadcasting purposes, the present invention is appropriate for use in all other forms of television practice. It is also to be noted that while the present invention has special utility in photographing performers as a means of televising their performance it is also adapted for the broad use of photographing one or more performers either for still or moving pictures while said performers are posing, or acting out a performance in the immediate presence of an audience, the invention making this possible without the interposition of camera equipment between the performers and the audience.

While I have shown the preferred method of broadcasting a television performance and a preferred means for practising said invention, it is to be understood that various changes may be made in the means utilized and the method of procedure by those skilled in the art without departing from the spirit of the invention, as claimed.

Having thus described my invention, what I claim and desire to secure by Letters Patent is:

1. Means for use in televising a performance while being enacted before an audience, including: a partition normally interposed between a performer and an audience, said partition being characterized by being transparent to the audience to enable said audience to directly view said performer therethrough and in having an image-reflecting surface which appears opaque on the side thereof presented to the performer; and television camera equipment located on the reflecting surface side of said partition positioned to receive images of said performer appearing of said reflecting surface.

2. Means for use in televising a performance while being enacted before an audience, including: a partition normally interposed between a performer and an audience, said partition being characterized by being transparent to the audience to enable said audience to directly view said performer therethrough and in having an image-reflecting surface which appears opaque on the side thereof presented to the performer; television camera equipment located on the reflecting surface side of said partition positioned to receive images of said performer appearing on said reflecting surface; and means providing brighter illumination on the performer's side of said partition than on the audience's side thereof.

3. Means for use in photographing a performance while being enacted before an audience, comprising: a stage upon which a performer may appear; a back drop for said stage, said back drop having at least one opening formed therein; a partition disposed forwardly of said back drop and normally interposed between said audience and performer, said partition being characterized by being transparent to the audience to enable said audience to directly view a performer therethrough and in having an image-reflecting surface which appears opaque on the side thereof presented to the performer; and camera means at the rear of said back drop focused on said reflecting surface through at least said one opening in said back drop so that the image of the performer appearing on said surface may be reflected to said camera means.

4. Means for use in televising a performance while being enacted before an audience, comprising: a stage upon which a performer may appear; a back drop for said stage, said back drop having a plurality of openings formed therein; a partition disposed forwardly of said back drop and normally interposed between said audience and performer, said partition being characterized by being transparent to the audience to enable said audience to directly view a performer therethrough and in having an image-reflecting surface which appears opaque on the side thereof presented to the performer; and television cameras at the rear of said back drop, each of said cameras being focused on said reflecting surface through one of the openings in said back drop so that the image of the performer appearing on said surface may be reflected to said cameras.

JEAN LEONARD.

REFERENCES CITED

The following references are of record in the file of this patent:

UNITED STATES PATENTS

| Number | Name | Date |
|---|---|---|
| 2,122,918 | Phinney | July 5, 1938 |
| 2,311,914 | Tiffin | Feb. 23, 1943 |
| 2,315,784 | Goodale | Apr. 6, 1943 |
| 2,354,199 | Collins | July 25, 1944 |
| 2,420,198 | Rosenthal | Aug. 6, 1947 |
| 2,426,752 | Sceli | Sept. 2, 1947 |
| 2,474,297 | Young | June 28, 1949 |
| 2,489,835 | Traub | Nov. 29, 1949 |
| 2,494,000 | Robertson | Jan. 10, 1950 |